United States Patent
Ho et al.

(10) Patent No.: US 10,381,953 B2
(45) Date of Patent: Aug. 13, 2019

(54) BI-DIRECTIONAL ELECTRIC POWER CONVERSION CIRCUIT WITH BRIDGELESS BUCK-BOOST CIRCUIT AND RECONFIGURABLE CAPACITOR-INDUCTOR FILTER CIRCUIT

(71) Applicant: University of Manitoba, Winnipeg (CA)

(72) Inventors: Ngai Man Ho, Winnipeg (CA); King Man Siu, Winnipeg (CA)

(73) Assignee: The University of Manitoba, Winnipeg, Manitoba (CA)

( * ) Notice: Subject to any disclaimer, the term of this patent is extended or adjusted under 35 U.S.C. 154(b) by 0 days.

(21) Appl. No.: 15/794,553

(22) Filed: Oct. 26, 2017

(65) Prior Publication Data

US 2018/0115256 A1    Apr. 26, 2018

Related U.S. Application Data

(60) Provisional application No. 62/413,262, filed on Oct. 26, 2016.

(51) Int. Cl.
*H02M 7/797* (2006.01)
*H02M 1/42* (2007.01)
(Continued)

(52) U.S. Cl.
CPC ......... *H02M 7/797* (2013.01); *H02M 1/4225* (2013.01); *H02M 7/217* (2013.01); *H02M 2001/123* (2013.01); *Y02B 70/126* (2013.01)

(58) Field of Classification Search
CPC ............................ H02M 7/797; H02M 1/4225
See application file for complete search history.

(56) References Cited

U.S. PATENT DOCUMENTS

| 7,046,534 B2 | 5/2006 | Schmidt et al. |
| 7,411,802 B2 | 8/2008 | Victor et al. |

(Continued)

FOREIGN PATENT DOCUMENTS

| CN | 100536306 | 6/2008 |
| CN | 203219195 | 9/2013 |
| EP | 2882090 | 6/2015 |

OTHER PUBLICATIONS

VDE-AR-N 4105, "Power generation systems connected to the low-voltage distribution network".
(Continued)

*Primary Examiner* — Gustavo A Rosario-Benitez
*Assistant Examiner* — Lakaisha Jackson
(74) *Attorney, Agent, or Firm* — Gowling WLG (Canada) LLP

(57) ABSTRACT

A bidirectional bridgeless buck-boost power converter circuit is provided that can function as both a voltage source inverter (VSI) circuit to transform direct current (DC) voltage to alternating current (AC) voltage and as a power factor corrector (PFC) circuit to transform AC voltage to DC voltage. The disclosed converter fully utilizes inductors to form a CL filter and buck-boost converter energy storage element. Thus, low inductance chokes are used in the converter, which leads to a higher power density and is more cost-effective. Further, the bridgeless configuration minimizes conduction losses of semiconductors, and coupled with the use of low inductance chokes this improves system efficiency.

12 Claims, 22 Drawing Sheets

(51) Int. Cl.
*H02M 7/217* (2006.01)
*H02M 1/12* (2006.01)

(56) References Cited

U.S. PATENT DOCUMENTS

| | | | | |
|---|---|---|---|---|
| 2012/0306412 | A1* | 12/2012 | Tang | H02M 3/155 318/400.3 |
| 2014/0153299 | A1* | 6/2014 | Jeong | H02M 1/4233 363/44 |
| 2015/0022164 | A1* | 1/2015 | Ye | H02M 1/4225 323/210 |
| 2015/0162822 | A1 | 6/2015 | Ho et al. | |

OTHER PUBLICATIONS

C. Ho et al.; "A comparative performance study of an interleaved boost converter using commercial Si and SiC diodes for PV applications", IEEE Trans. on Power Electronics vol. 28, No. 1, pp. 289-299, Jan. 2013.

R. Gonzalez et al.; "Transformerless Inverter for Single-Phase Photovoltaic Systems"; IEEE Trans. on Power Electronics vol. 22, No. 2, pp. 693-697, Mar. 2007.

R.O. Caceres and I. Barbi, "A Boost DC-AC Converter: Analysis, Design, and Experimentation"; IEEE Trans. on Power Electronics vol. 14, No. 1, pp. 134-141, Jan. 1999.

* cited by examiner

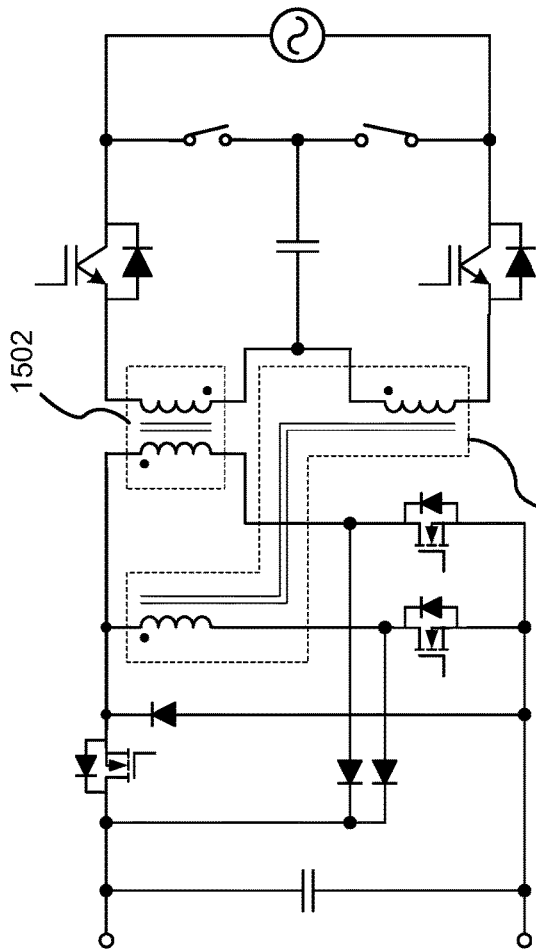
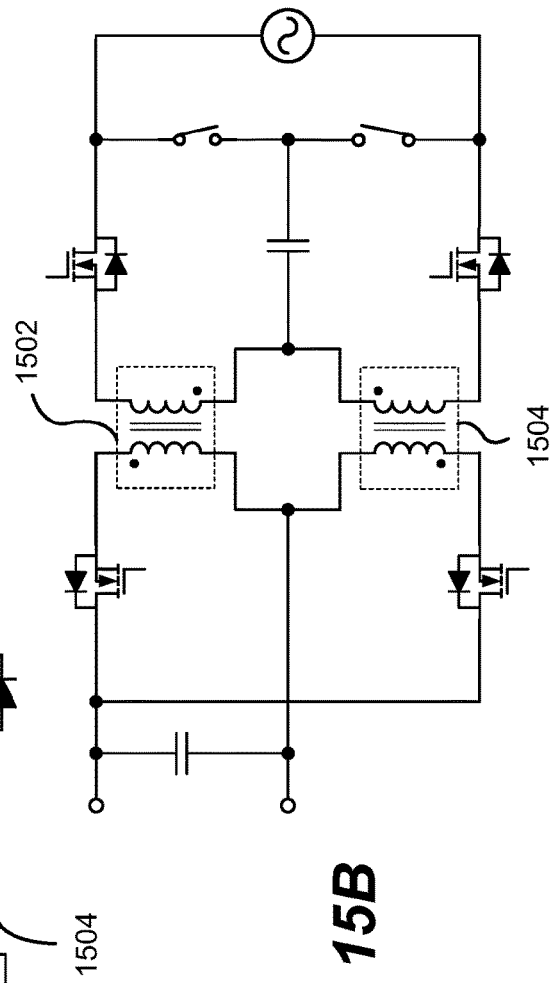
FIG. 15A
FIG. 15B

BI-DIRECTIONAL ELECTRIC POWER CONVERSION CIRCUIT WITH BRIDGELESS BUCK-BOOST CIRCUIT AND RECONFIGURABLE CAPACITOR-INDUCTOR FILTER CIRCUIT

CROSS-REFERENCE TO RELATED APPLICATION

The present application claims priority to U.S. application No. 62/413,262 filed Oct. 26, 2016, the entirety of which is incorporated by reference for all purposes.

TECHNICAL FIELD

The present disclosure relates to bi-directional bridgeless buck-boost converters for conversion from direct current (DC) voltage to single-phase current alternating (AC) voltage and vice versa.

BACKGROUND

Various industrial applications require the conversion of electric power from direct current (DC) voltage to alternating current (AC) voltage and vice versa. This can be achieved using Voltage Source Inverter (VSI) circuits and Power Factor Correction (PFC) circuits, respectively. Modern power electronics converters require high performance, such as high efficiency and high power density, and low cost. For some applications, the requirements are even higher in order to satisfy industrial standards, such as is the case with leakage current limits. However, most power converter circuits that are designed to try to minimize leakage current consequently reduce efficiency and power density.

In PFC circuits, the power factor of the AC flowing through the circuit should be corrected to be as close to 1 such that the real power delivered to the circuit is the same as the apparent power before being converted to DC. Correction of the power factor is typically achieved using a passive network of capacitors or inductors. The AC voltage is converted to the DC voltage using some sort of rectifier, however the DC output that is generated typically comprises pulses of current because the AC is sinusoidal, which accordingly may be smoothed out using a filter (usually some sort of capacitor arrangement).

PFC circuits are used in a wide range of applications, including but not limited to motor drives, electric vehicle chargers, electronic ballasts, uninterrupted power supply systems, etc. However, several problems exist when these circuits are implemented. A first problem is a low efficiency problem due to high losses in the conversion of the voltage. This is because in a power supply unit there are usually two power stages, the first being a PFC stage to shape the input current to be sinusoidal to meet industrial standards and to step up the grid voltage (e.g. 120V) to be higher than the peak voltage of the grid (e.g. 200V), and the second stage comprising a buck-converter to step down the voltage (e.g. 48V). A second problem is a common mode voltage issue, which is a common problem for bridgeless converters (used so that the output has the same polarity as the input). Conventional bridgeless converters create high voltage jumping between a negative port of the DC link and system ground, which leads to high leakage current that fails to meet industrial standards. Attempts have been made to try to correct these issues, but often require a large number of semiconductors in the current path leading to high conduction losses and costs, and/or require large input filters.

Broadly, VSI circuits perform the opposite of PFC circuits in that they are converting a DC voltage to an AC voltage. Since the voltage is being converted from DC, the power factor should already be equal to 1 and thus there is no power factor correction required in AC. VSI circuits are used in a wide range of applications, including but not limited to: photovoltaic (PV) inverters where the variable DC output of a solar PV panel is converted into AC to be fed into a commercial electric grid or for use by an off-grid network, fuel cell inverters which perform similar function but with fuel cells, other grid-connected applications, etc.

However, several problems exist when these circuits are implemented. Similar to PFC circuits, there are low efficiency problems and common mode voltage issues. With regards to a PV inverter for example, there are typically two power stages—the first being a DC-DC boost converter for Maximum Power Point Tracking (MPPT) to determine the maximum power output from the PV power and to maintain the DC voltage link at a high enough value for the second power stage, which is the VSI comprising a buck-type DC-AC inverter and which shapes the output current as a sine wave to meet industrial standards. The first stage requires a boost converter to bring up the voltage from the PV panels to the DC link capacitor bank. This approach gives an unimpressive efficiency for the whole converter of maximum 97% for a 1.5 kW system, due to the two power conversion stages.

Again using a PV inverter as an example, the common mode voltage issue is typical for transformerless PV inverters because there is high voltage jumping between a negative port of PV panels and the system ground, this leads to a shorter lifetime of the PV panels and creates electromagnetic interference noise to the grids, as well as potentially poses a safety issue for users. Thus there are regulations to limit the value of the leakage current of a VSI (for example, in Europe: DIN V VDE V 0126-1-1, which limits the leakage current to 300 mA).

Conventionally, using bi-polar switching was a solution to the leakage current issue, however this creates increased switching losses and increases the size of grid inductors in order to achieve small current ripples. Other attempts have been made to solve these problems but produce negative effects such as increased conduction losses due to a large number of semiconductors.

Accordingly, an improved bridgeless buck-boost electrical power converter circuit remains highly desirable.

BRIEF DESCRIPTION OF THE DRAWINGS

Further features and advantages of the present disclosure will become apparent from the following detailed description, taken in combination with the appended drawings, in which:

FIGS. 15A and 15B show exemplary isolation circuits for the power converter circuits described herein;

It will be noted that throughout the appended drawings, like features are identified by like reference numerals.

DETAILED DESCRIPTION

The present disclosure provides an electric power conversion circuit, comprising: a direct current (DC) voltage connection interface providing a positive DC port and a negative DC port; an alternating current (AC) voltage connection interface providing a positive AC port and a negative AC port; a first series connection having a first diode (D1) with a first inductor (L1), connected in parallel with the positive DC port and negative DC port of the DC voltage connection; a second series connection having a second diode (D2) with a second inductor (L2), connected in parallel with the positive DC port and negative DC port of the DC voltage connection; a first switch (S3) having a first end connected to a point along the first series connection between the first diode (D1) and the first inductor (L1), and having a second end connected to the positive AC port of the AC voltage connection; a second switch (S4) having a first end connected to a point along the second series connection between the second diode (D2) and the second inductor (L2); and a reconfigurable capacitor-inductor (CL) filter circuit configured to connect one or more switching capacitors (CAB; CA, CB) between the AC ports and the DC ports.

The invention will now be described in detail with reference to various embodiments thereof as illustrated in the accompanying drawings. Specific details are set forth in order to provide a thorough understanding of the invention. It will be apparent to one skilled in the art that the invention may be practiced without using some of the implementation details set forth herein. It should also be understood that well known operations have not been described in detail in order to not unnecessarily obscure the invention. Embodiments are described below, by way of example only, with reference to FIGS. 1-19.

The present disclosure provides a bidirectional bridgeless buck-boost power converter circuit, wherein bidirectional means that the converter circuit can function as both a voltage source inverter (VSI) circuit to transform DC voltage to AC voltage and as a power factor corrector (PFC) circuit to transform AC voltage to DC voltage. The disclosed converter fully utilizes inductors to form a CL filter and buck-boost converter energy storage element. Thus, low inductance chokes are used in the converter, which leads to a higher power density and is more cost-effective. Further, the bridgeless configuration minimizes conduction losses of semiconductors, and coupled with the use of low inductance chokes this improves system efficiency.

Figure 1:
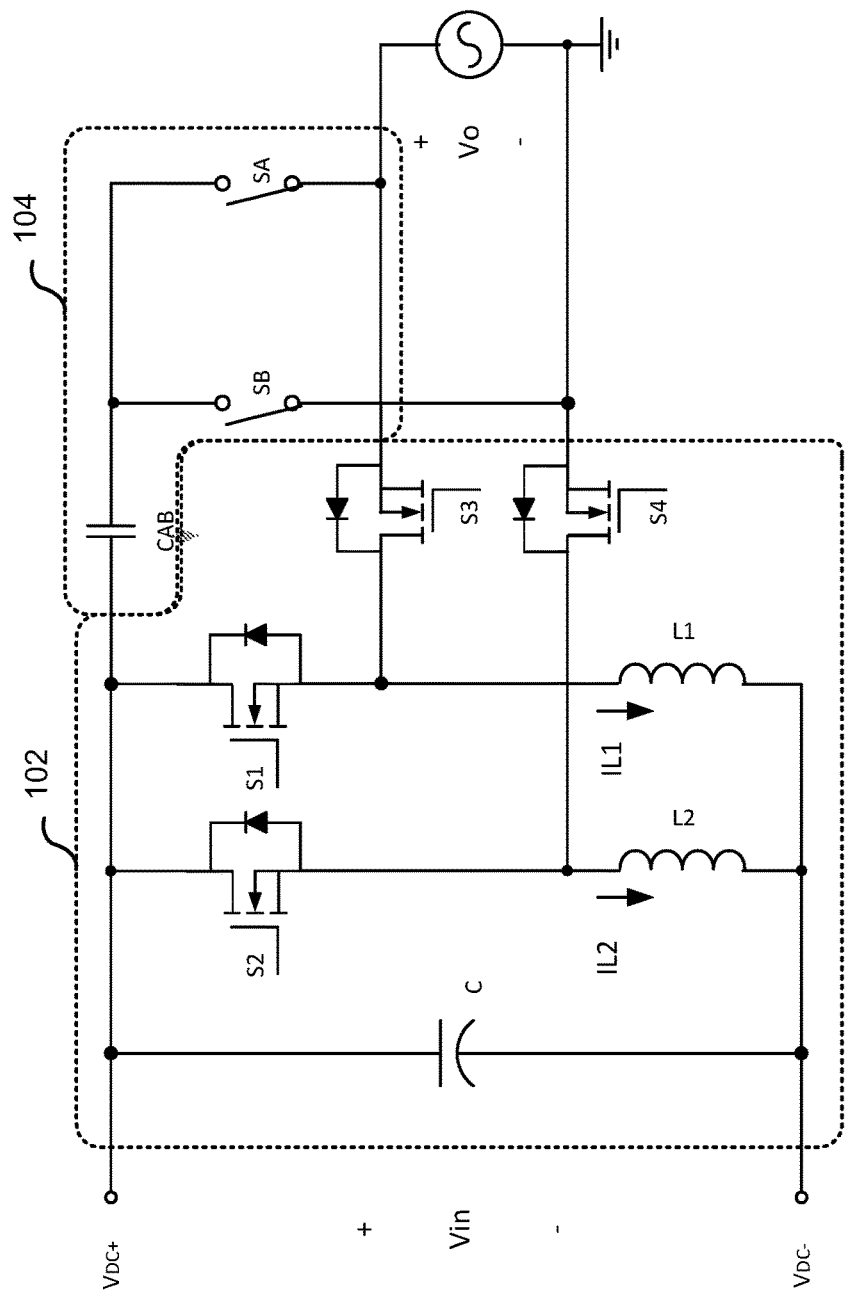
FIG. 1 shows a grid-connected voltage source inverter (VSI) circuit comprising a bridgeless buck-boost that can transform direct current (DC) voltage to single-phase alternating current (AC) voltage.

FIG. 1 shows a grid-connected voltage source inverter (VSI) circuit comprising a bridgeless buck-boost that can transform direct current (DC) voltage to single-phase alternating current (AC) voltage. This could be used in several applications including but not limited to PV inverters, fuel cell inverters, etc. The VSI circuit receives input voltage from a DC source having positive and negative ports $V_{DC+}$ and $V_{DC-}$, respectively, at a DC voltage connection interface. The output voltage is AC, with output ports corresponding to the positive and negative AC ports at an AC voltage connection interface. The VSI converter circuit comprises four high frequency semi-conductor switches (S1-S4), two low frequency bi-directional switching semi-conductor switches (SA and SB), two inductors (L1 and L2), and one capacitor (CAB). The DC connection interface may comprise one or more capacitors (C) between the positive and negative ports. The VSI circuit may be broken down into two main sub-components, a bridgeless buck-boost circuit 102, and a reconfigurable capacitor-inductor (CL) filter circuit 104 which may also be referred to as an active virtual ground (AVG) circuit.

The bridgeless buck-boost circuit 102 comprises a capacitor, C, at the DC voltage connection interface between the positive ($V_{DC+}$) and negative ($V_{DC-}$) ports. There are two series connections comprising switches S1 and S2 respectively in series with two inductors L1 and L2. The switches comprise a high-frequency semiconductor switch with parasitic anti-parallel diodes. The polarity of these switches are such that the switches can block current from flowing through the switches to the negative DC voltage input port $V_{DC-}$. The inductors can be used as a buck-boost energy storage inductor or a grid filtering inductor depending on the polarities. These series connections are in parallel with the positive and negative ports of the DC voltage source $V_{in}$. The bridgeless buck-boost circuit 102 further comprises two additional switches S3 and S4 (again each comprising a high-frequency semiconductor switch with a parasitic anti-parallel diode) which have a first end connected along the series connections of the switches S1, S2 and the inductors L1, L2. In particular, switch S3 has a first end connected at a point between the switch S1 and inductor L1, and switch S4 has a first end connected at a point between the switch S2 and inductor L2. A second end of the switches S3 and S4 connect to AC output ports. In particular, switch S3 has a second end connected to the positive AC output port, and the switch S4 has a second end connected to the negative AC output port. The switches S3 and S4 have polarity such that they can block current from flowing to the respective AC output port. That is, switch S3 can prevent current from flowing to the positive AC output port, and switch S4 can prevent current from flowing to the negative AC output port.

The VSI circuit further includes a reconfigurable CL filter circuit 104 as a filtering technique. This circuit is configured to connect a capacitor $C_{AB}$ between the DC input ports and the AC output ports. This allows positive current to flow to the positive AC voltage output port corresponding to a positive part of the AC sine wave, and for negative current to flow to the negative AC voltage output port corresponding to a negative part of the AC sine wave. This switching is achieved through the use of low frequency bi-directional switching semiconductor switches SA and SB, of which SA is connected in series between the input DC voltage ports and the positive AC output port, and SB is connected in series between the input DC voltage ports and the negative AC output port. The bi-directional switches SA and SB may be realized by connecting two MOSFETs back-to-back in series or other circuits and devices which can provide bi-directional blocking characteristics, as will be described with reference to FIG. 3. Thus, the reconfigurable CL filter circuit 104 can formulate two different CL filter structures depending on grid voltage polarity. This provides grid-connected capability and reduces the number of components required to be used.

The configuration of the VSI circuit provides several benefits which will be further discussed herein, including but not limited to low semiconductor losses, low leakage current, as well a wide range of input voltage control capacity. In particular, the single stage buck-boost circuit 102 increases efficiency due to the elimination of unnecessary power stages. The reconfigurable CL filter circuit 104 provides a capacitor in between the DC voltage input and the AC voltage output, which eliminates the conventional common mode voltage issue since the capacitor in the CL filter clamps the voltage between the grid and the positive port of the DC voltage connection interface.

Figure 2:
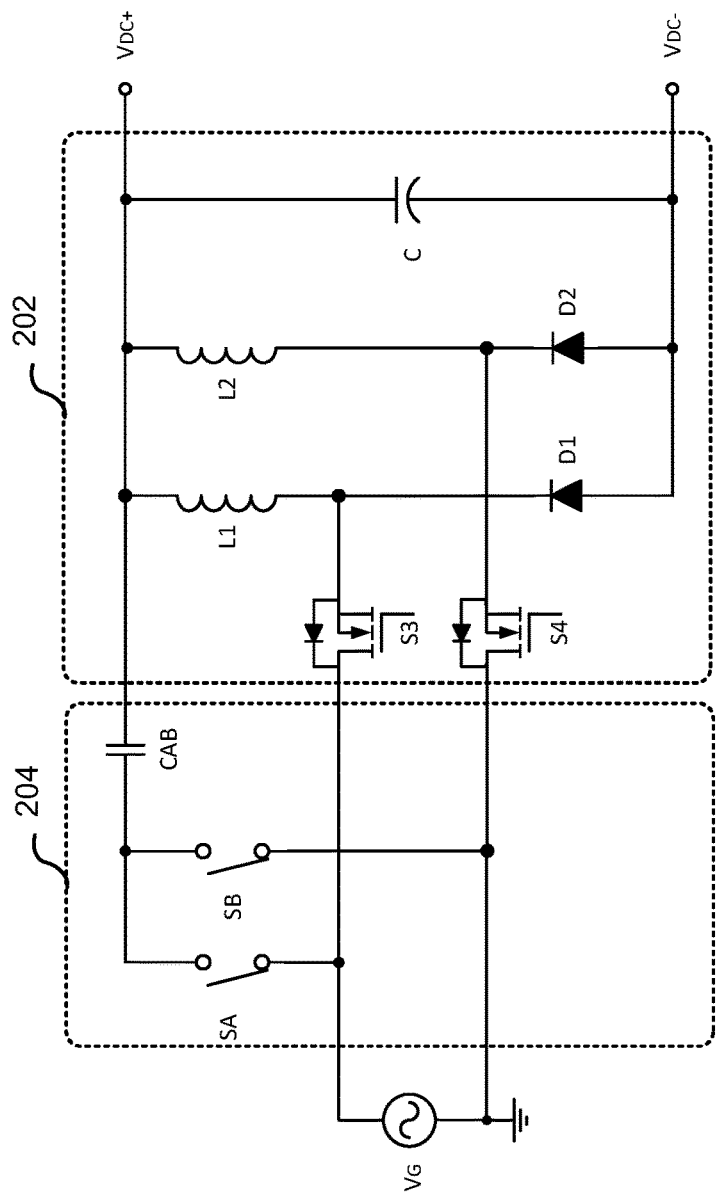
FIG. 2 shows a bridgeless buck-boost power factor correction (PFC) circuit that can transform single-phase alternating current (AC) voltage to direct current (DC) voltage.

FIG. 2 shows a bridgeless buck-boost power factor correction (PFC) circuit that can transform single-phase alternating current (AC) voltage to direct current (DC) voltage. This could be used in several applications including but not limited to battery chargers, server power supplies, AC and DC grid interfaces, etc. The PFC circuit receives input voltage from an AC source having positive and negative ports at an AC voltage connection interface. The output voltage is DC, with output ports corresponding to the positive and negative DC ports $V_{DC+}$ and $V_{DC-}$, respectively at a DC voltage connection interface. The PFC converter bucks or boosts the AC grid voltage to the DC voltage connection interface and controls the flow of DC power. The PFC converter comprises two diodes (D1 and D2), two high-frequency semiconductor switches (S3 and S4), two low frequency bi-directional switching semiconductor switches (SA and SB), two inductors (L1 and L2), and one capacitor (CAB). The DC connection interface may comprise one or more capacitors (C) between the positive and negative ports. The PFC circuit may be broken down into two main sub-components, a bridgeless buck-boost circuit 202, and a reconfigurable CL filter circuit 204.

The bridgeless buck-boost circuit 202 comprises a capacitor, C, at DC voltage connection interface between the positive ($V_{DC+}$) and negative ($V_{DC-}$) ports. There are two series connections comprising diodes D1 and D2 respectively in series with two inductors L1 and L2. The polarity of these diodes are such that the diodes can block current from flowing to the negative DC voltage output port $V_{DC-}$. The inductors can be used as a buck-boost energy storage inductor or a grid filtering inductor depending on the polarities. These series connections are in parallel with DC voltage connection interface. The bridgeless buck-boost circuit 102 further comprises two switches S3 and S4 comprising a high-frequency semiconductor switch with a parasitic anti-parallel diode, which have a first end connected along the series connections of the diodes D1, D2 and the inductors L1, L2. In particular, switch S3 has a first end connected at a point between the diode D1 and inductor L1, and switch S4 has a first end connected at a point between the diode D2 and inductor L2. A second end of the switches S3 and S4 connect to AC input ports. In particular, switch S3 has a second end connected to the positive AC input port, and the switch S4 has a second end connected to the negative AC input port. The switches S3 and S4 have polarity such that they can block current from flowing from the respective AC input port. That is, switch S3 can prevent current from flowing from the positive AC input port, and switch S4 can prevent current from flowing from the negative AC input port.

The PFC circuit further includes a reconfigurable CL filter circuit 204 as a filtering technique. This circuit is configured to connect a capacitor $C_{AB}$ between the AC input ports and the DC output ports. This allows positive current to flow from the positive AC voltage input port corresponding to a positive part of the AC sine wave, and for negative current to flow from the negative AC voltage input port corresponding to a negative part of the AC sine wave. This switching is achieved through the use of low frequency bi-directional switching semiconductor switches SA and SB, of which SA is connected in series between the positive input AC voltage port and the DC output ports, and SB is connected in series between the negative input AC voltage port and the DC output ports. The bi-directional switches SA and SB may be realized by connecting two MOSFETs back-to-back in series or other circuits and devices which can provide bi-directional blocking characteristics, as will be described with reference to FIG. 3. Thus, the reconfigurable CL filter circuit 204 can formulate two different CL filter structures depending on grid voltage polarity. This provides grid-connected capability and reduces the number of components required to be used.

The configuration of the PFC circuit provides several benefits which will be further discussed herein, including but not limited to low semiconductor losses, low leakage current, as well a wide range of output voltage control capacity. In particular, the single stage buck-boost circuit 202 increases efficiency due to the elimination of unnecessary power stages. The reconfigurable CL filter circuit 204 provides a capacitor in between the AC voltage input and the DC voltage output, which eliminates the conventional common mode voltage issue since the capacitor in the CL filter clamps the voltage between the grid and the positive port of the DC voltage connection interface.

Figure 3:
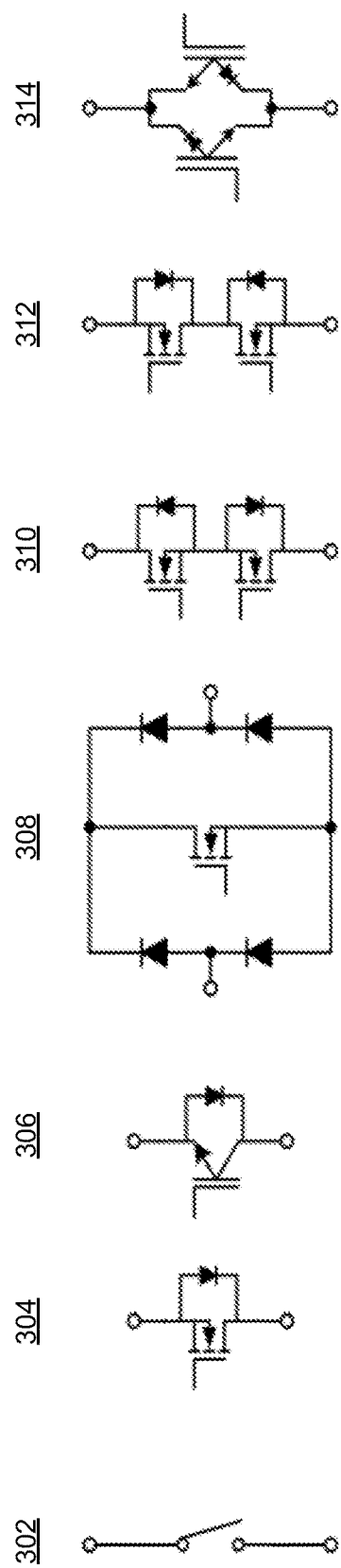
FIG. 3 provides possible configurations for bi-directional switch arrangements.

FIG. 3 provides possible configurations for bi-directional switch (SA or SB) arrangements. Any of these configurations could be implemented to obtain the functionality of aforementioned bi-directional switches SA and SB. Configuration 302 represents an ideal switch, configurations 304 and 306 are alternatives that could be used in the PFC circuit or in the VSI circuit if PF=1 (for reactive power control they do not make sense), configuration 308 represents a diode bridge, configuration 310 represents a common emitter back-to-back, configuration 312 represents a common drain back-to-back, and configuration 314 represents anti-paralleled reverse blocking insulated-gate bipolar transistors (IGBTs).

Switching states and equivalents are now described to exemplify some of the functionality and operation of the VSI and PFC circuits shown in FIGS. 1 and 2.

Figure 4B:
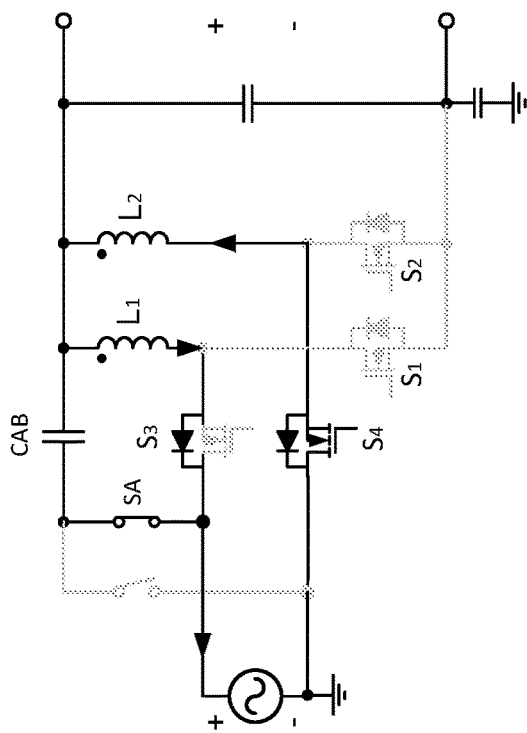
FIGS. 4A and 4B show two switching states in the VSI during a positive half line cycle.
Figure 4A:
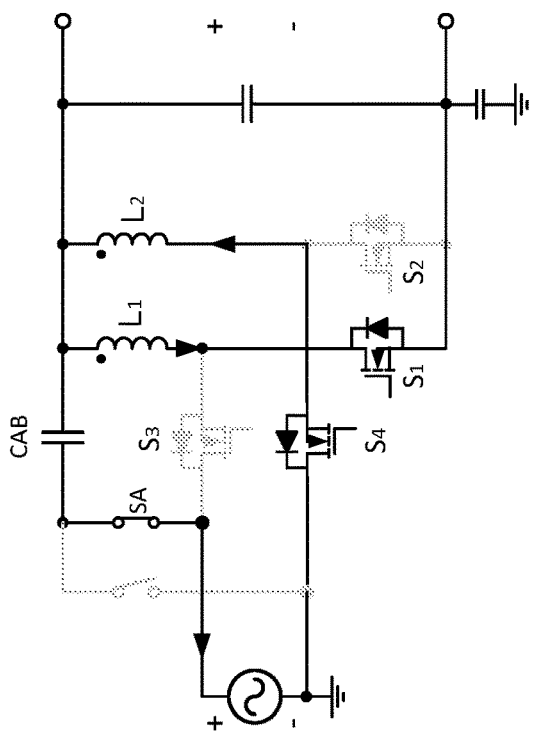

FIGS. 4A and 4B show two switching states in the VSI during a positive half line cycle. In this half line cycle, the filter capacitor (CAB) is connected to line (+) of the grid voltage through the bi-directional switch (SA), the switch (S4) is always conducting and the switch (S2) is always open. The switch (S1) is switching at a high frequency and the anti-paralleled diode of S3 is conducting alternatively. FIGS. 4A and 4B show the circuit when the switch (S1) is switched on and off, respectively.

Figure 5A:
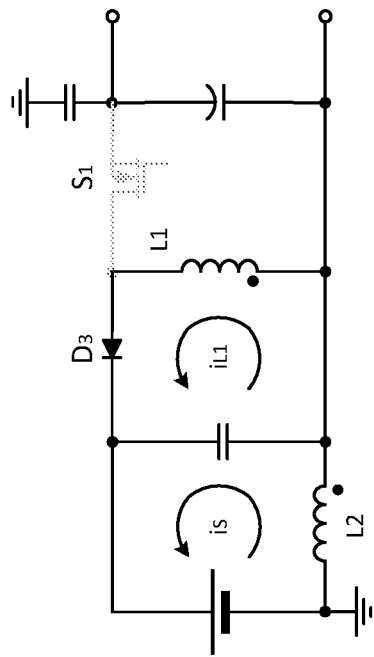
FIGS. 5A and 5B are corresponding equivalent circuits of FIGS. 4A and 4B, respectively.
Figure 5B:
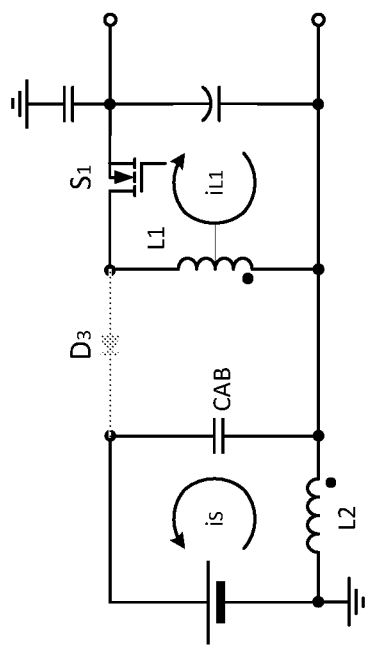

FIGS. 5A and 5B are corresponding equivalent circuits of FIGS. 4A and 4B, respectively. It can be seen that CAB and L2 form a CL filter between the grid and the buck-boost converter. L1 is a buck-boost converter storage element in order to absorb the energy from the DC link and release it to the filtering capacitor CAB. Capacitor CAB is coupled between line (+) and the positive port of DC voltage connection interface, the potential difference between them is clamped, therefore low leakage current is achieved.

Figure 6B:
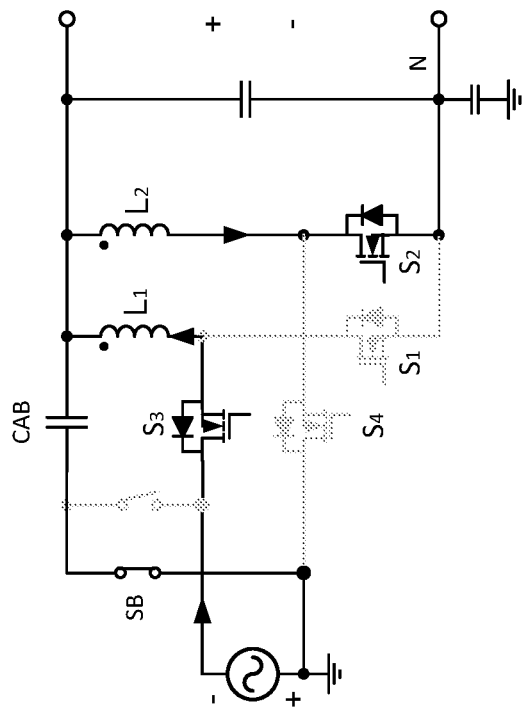
FIGS. 6A and 6B show two switching states in the VSI during a negative half line cycle.
Figure 6A:
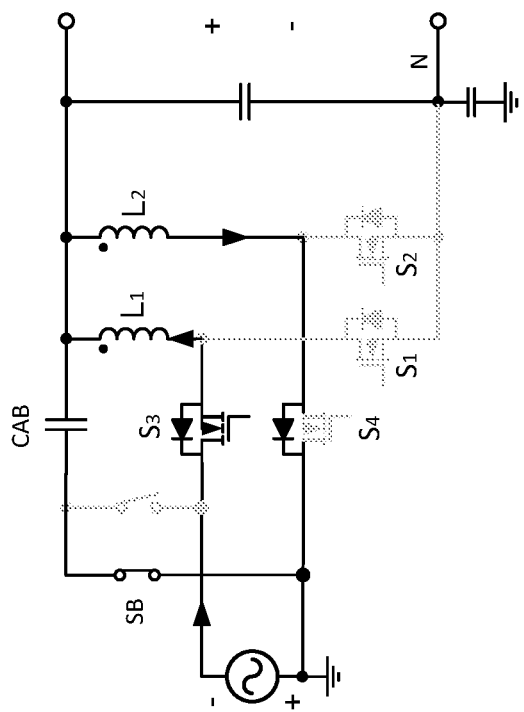

FIGS. 6A and 6B show two switching states in the VSI during a negative half line cycle. In this half line cycle, the filter capacitor (CAB) is connected to Neutral (N) of the grid voltage through the bi-directional switch (SB), the switch (S3) is always conducting and the switch (S1) is always open. The switch (S2) is switching at a high frequency and the anti-paralleled diode of S4 is conducting alternatively. FIGS. 6A and 6B show the circuit when the switch (S2) is switched on and off, respectively.

Figure 7A:
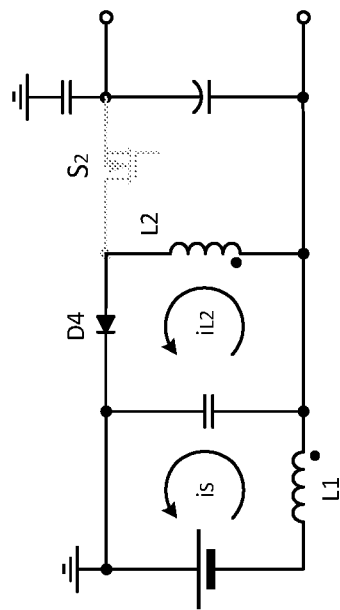
FIGS. 7A and 7B are corresponding equivalent circuits of FIGS. 6A and 6B, respectively.
Figure 7B:
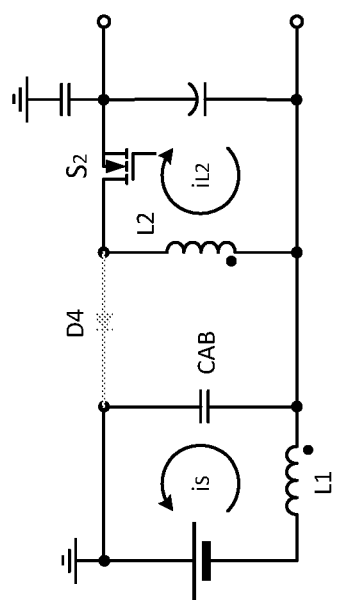

FIGS. 7A and 7B are corresponding equivalent circuits of FIGS. 6A and 6B, respectively. It can be seen that CAB and L1 form a CL filter between the grid and the buck-boost converter. L2 is a buck-boost converter storage element in order to absorb the energy from the DC link and release it to the filtering capacitor (CAB). Capacitor CAB is coupled between line (+) and the positive port of DC voltage connection interface, the potential difference between them is clamped, therefore low leakage current is achieved.

Table 1 below summarizes the switching actions of all of the switches in the four-quatral operating modes for the VSI. The four-quatral operating modes allows the VSI to deliver reactive power. In Table 1, "1" represents high, "0" represents low, "X" represents it does not matter, "HF" represents high frequency, and "LF" represents low frequency.

TABLE 1

| Switching State | Input Voltage | Input Current | SA | SB | S1 | S2 | S3 | S4 | L1 | L2 | CDC |
|---|---|---|---|---|---|---|---|---|---|---|---|
| 1 | +ve | +ve | 1 | 0 | 1 | 0 | 0 | 1 | HF | LF | Discharge |
| 2 | +ve | +ve | 1 | 0 | 0 | 0 | 0 | 1 | HF | LF | Open |
| 3 | +ve | −ve | 1 | 0 | 0 | 0 | 1 | X | HF | LF | Open |
| 4 | +ve | −ve | 1 | 0 | 0 | 0 | 0 | X | HF | LF | Charge |
| 5 | −ve | −ve | 0 | 1 | 0 | 1 | 1 | 0 | LF | HF | Discharge |
| 6 | −ve | −ve | 0 | 1 | 0 | 0 | 1 | 0 | LF | HF | Open |
| 7 | −ve | +ve | 0 | 1 | 0 | 0 | X | 1 | LF | HF | Open |
| 8 | −ve | +ve | 0 | 1 | 0 | 0 | X | 0 | LF | HF | Charge |

Figure 8A:
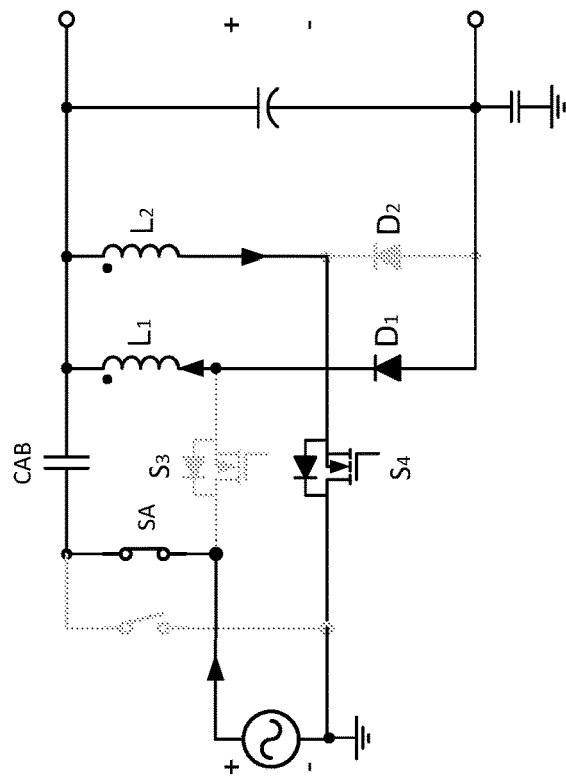
FIGS. 8A and 8B show two switching states in the PFC during a positive half line cycle.
Figure 8B:
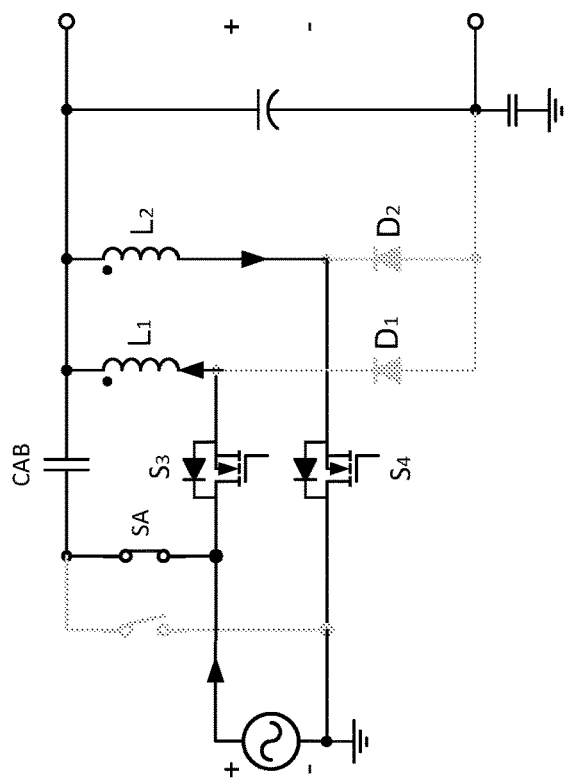

FIGS. 8A and 8B show two switching states in the PFC during a positive half line cycle. In this half line cycle, the filter capacitor (CAB) is connected to Line (+) of the grid voltage through the bi-directional switch (SA), the switch (S4) is always conducting and the switch (S3) is switching at a high frequency. FIGS. 8A and 8B show the circuit when the switch (S3) switching on and off, respectively.

Figure 9A:
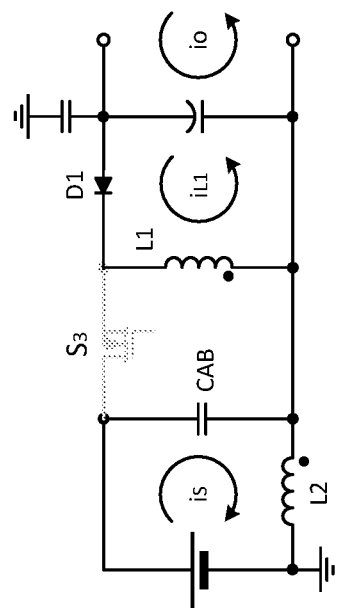
FIGS. 9A and 9B are corresponding equivalent circuits of FIGS. 8A and 8B respectively.
Figure 9B:
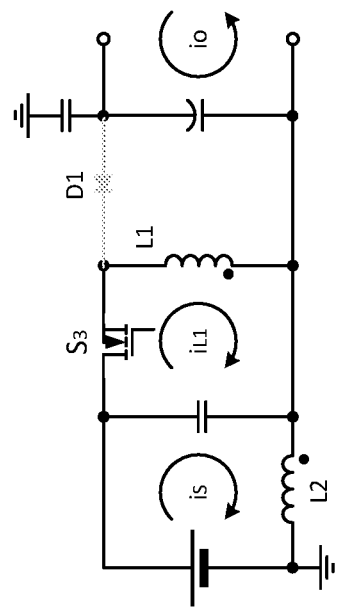

FIGS. 9A and 9B are corresponding equivalent circuits of FIGS. 8A and 8B respectively. It can be seen that CAB and L2 form a CL filter between the grid and the buck-boost converter. L1 is a buck-boost converter storage element in order to absorb the energy from the filtering CAB and release it to the DC link. Capacitor CAB is coupled between line (+) and the positive port of DC voltage connection interface, the potential difference between them is clamped, therefore low leakage current is achieved.

Figure 10B:
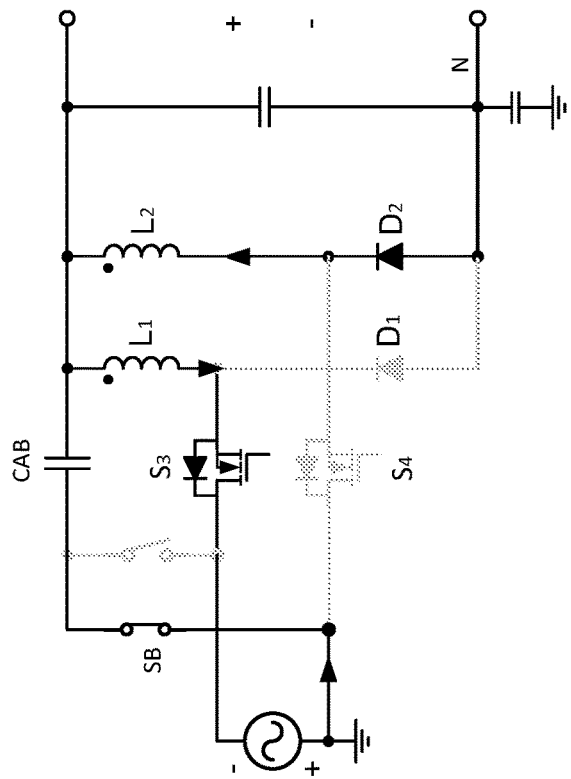
FIGS. 10A and 10B show two switching states in the PFC during a negative half line cycle.
Figure 10A:
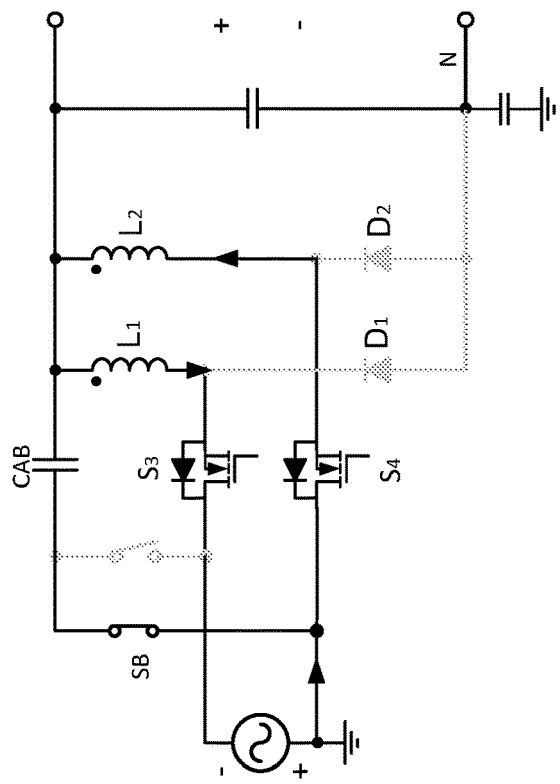

FIGS. 10A and 10B show two switching states in the PFC during a negative half line cycle. In this half line cycle, the filter capacitor (CAB) is connected to Neutral (N) of the grid voltage through the bi-directional switch (SB), the switch (S3) is always conducting and the switch (S4) is switching at a high frequency. FIGS. 10A and 10B show the circuit when the switch (S4) switching on and off, respectively.

Figure 11A:
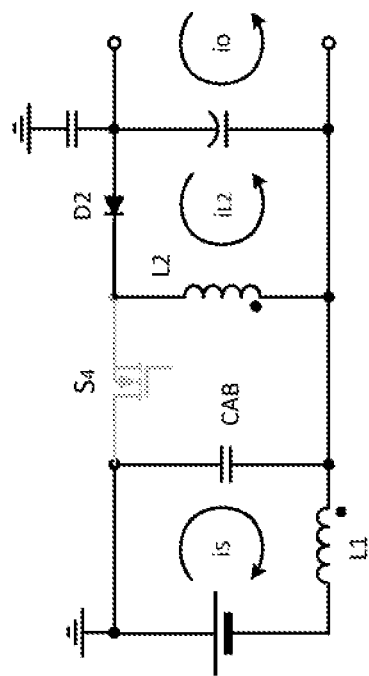
FIGS. 11A and 11B are corresponding equivalent circuits of FIGS. 10A and 10B respectively.
Figure 11B:
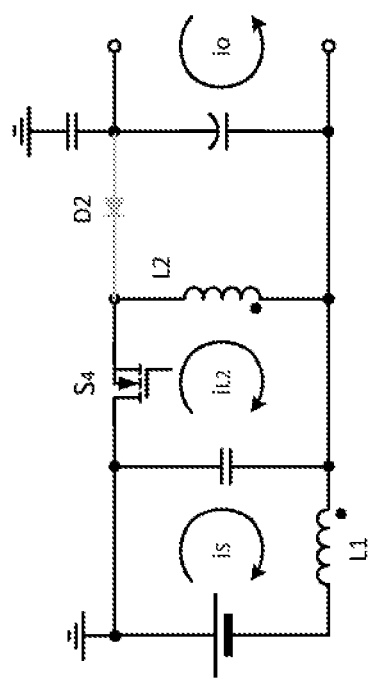

FIGS. 11A and 11B are corresponding equivalent circuits of FIGS. 10A and 10B respectively. It can be seen that CAB and L1 form a CL filter between the grid and the buck-boost converter. L2 is a buck-boost converter storage element in order to absorb the energy from the filtering capacitor (CAB) and release it to the DC link. Capacitor CAB is coupled between Neutral (N) and the positive port of DC voltage connection interface, the potential difference between them is clamped, therefore low leakage current is achieved.

In addition to the VSI and PFC circuits shown in FIGS. 1 and 2 with switching states as described with respect to FIGS. 4-11, several variants exist which provide similar performance. These are shown in FIGS. 12 and 13.

Figure 12A:
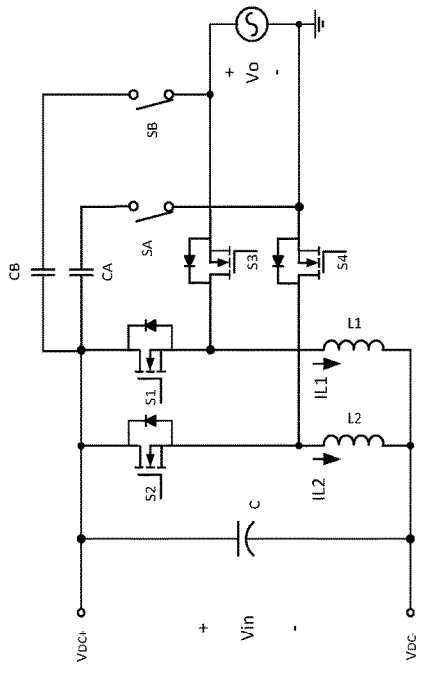
FIGS. 12A thru 12E show variants of the VSI circuit shown in FIG. 1.
Figure 12C:
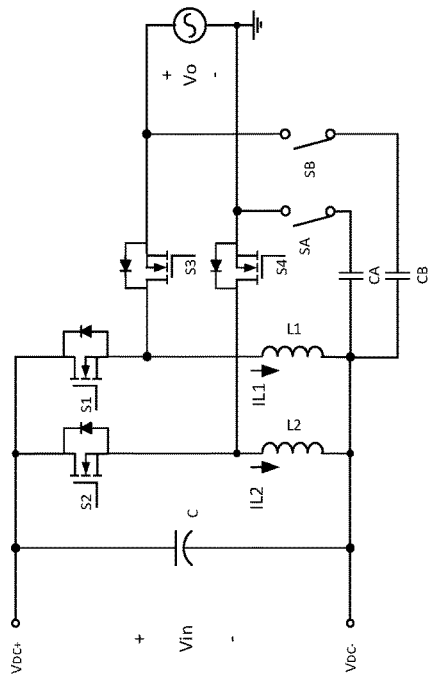
Figure 12B:
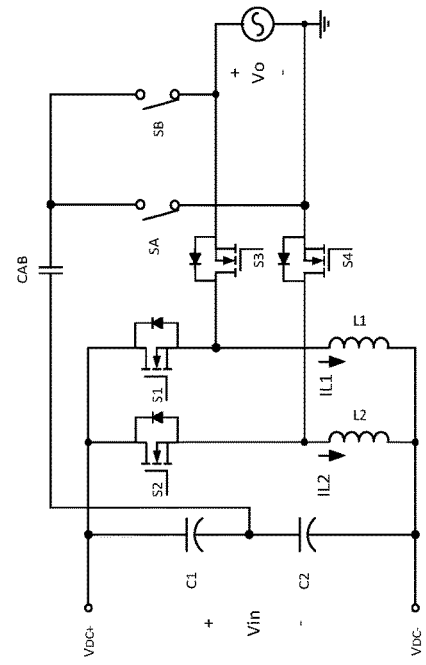
Figure 12E:
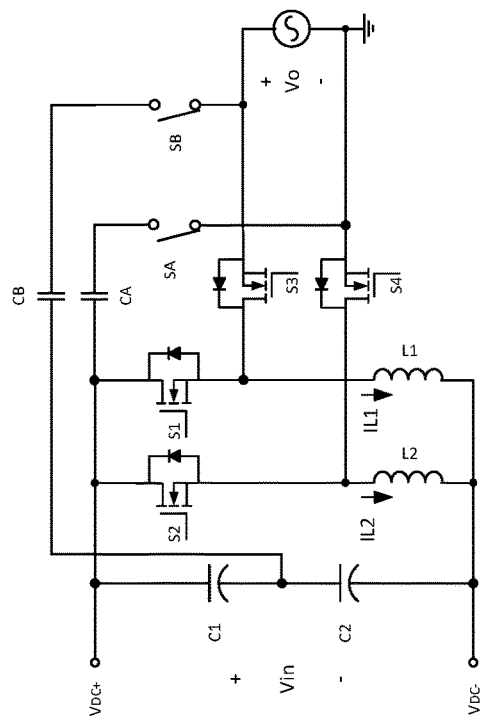
Figure 12D:
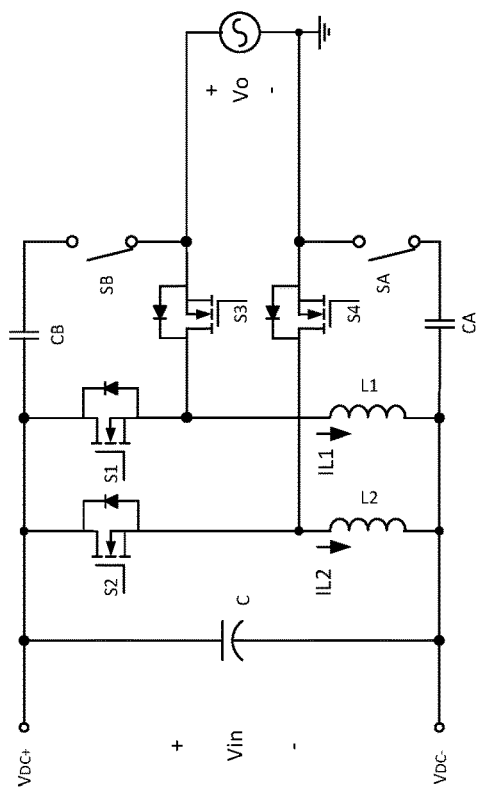

FIGS. 12A thru 12E show variants of the VSI circuit shown in FIG. 1. In particular, FIG. 12A shows the bi-directional switches SA and SB on the bottom and each connected in series with a respective capacitor CA and CB instead of a single capacitor CAB. The two capacitors CA and CB conduct alternately. FIG. 12B is the same as FIG. 12A but the switches SA and SB are again located at the top similar to FIG. 1. FIG. 12C shows the connection of capacitor CAB to a middle point of the DC voltage connection interface, and two capacitors C1 and C2 on the DC voltage connection interface. The connection of capacitor CAB can be at any location along the DC voltage connection interface. FIG. 12D shows one switch SB and capacitor CB located at the top and the other switch SA and capacitor CA located at the bottom. FIG. 12E shows the connection of 12C with one capacitor CB, but other capacitor CA connected to the DC voltage connection interface as shown in FIG. 1. Numerous other configurations could be readily envisioned by one of ordinary skill in the art that would provide the same or similar functionality as what is disclosed herein and would not depart from the scope of this disclosure.

Figure 13B:
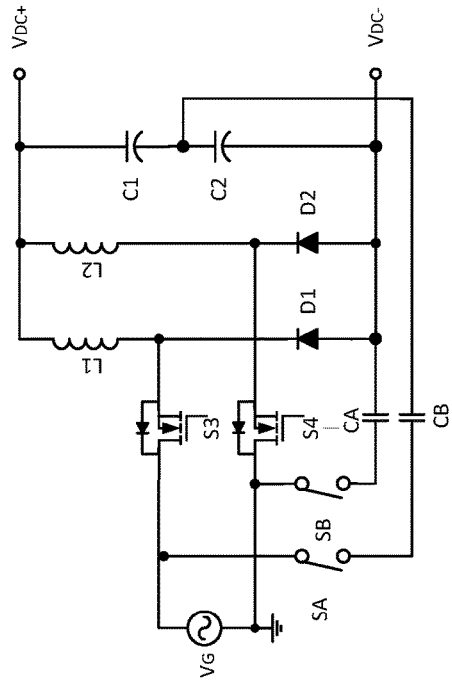
FIGS. 13A thru 13E show variants of the PFC circuit shown in FIG. 2.
Figure 13A:
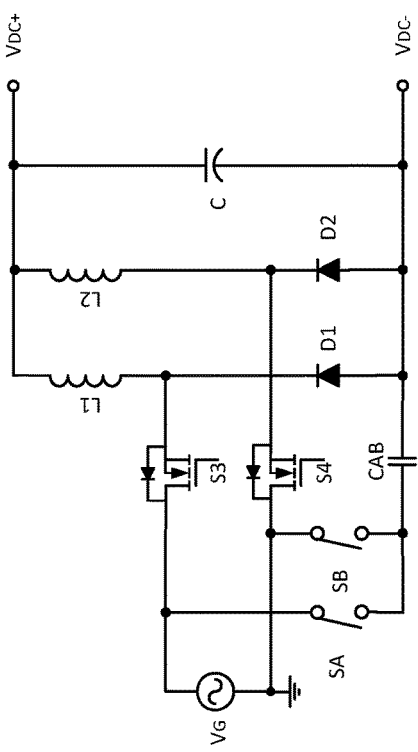
Figure 13C:
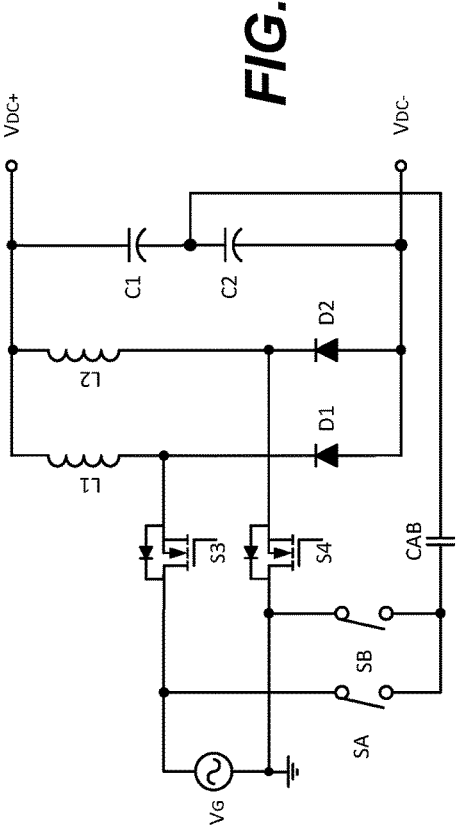
Figure 13E:
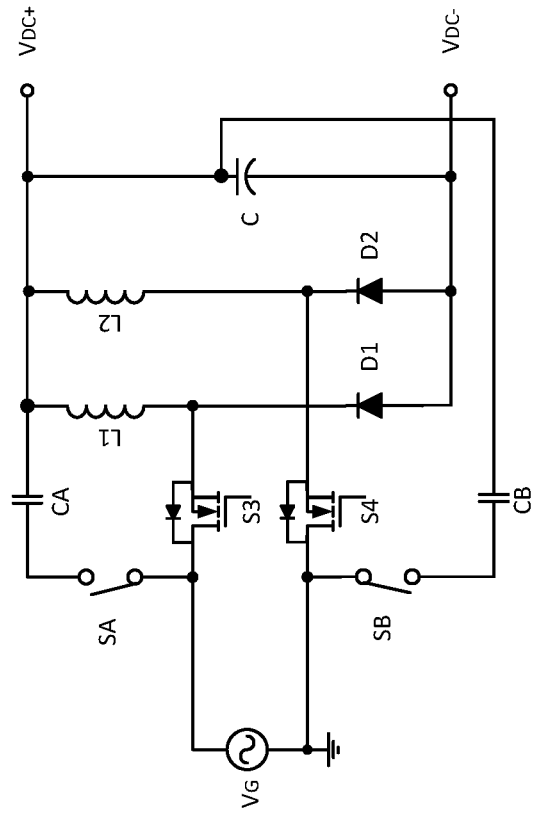
Figure 13D:
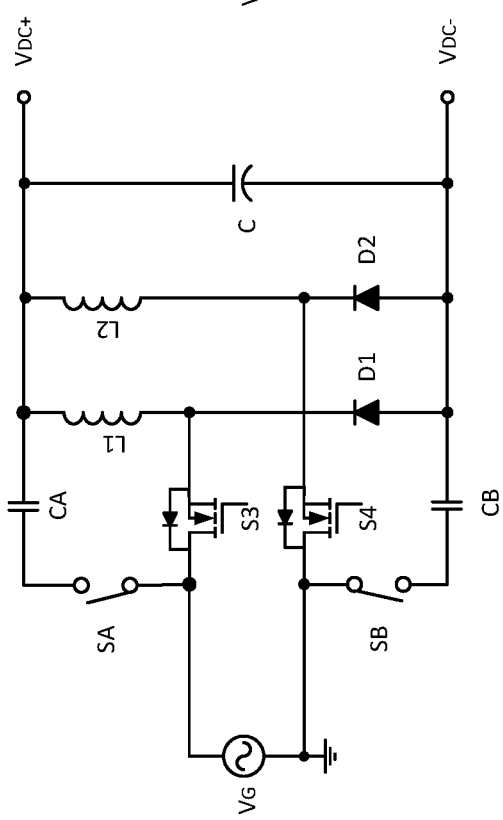

FIGS. 13A thru 13E show variants of the PFC circuit shown in FIG. 2. In particular, FIG. 13A shows the bi-directional switches SA and SB on the bottom instead of the top. FIG. 13B shows the switches SA and SB on the bottom and each connected in series with a respective capacitor CA and CB instead of a single capacitor CAB. The two capacitors CA and CB conduct alternately. FIG. 13C shows the switches SA and SB on the bottom and the connection of capacitor CAB to a middle point of the DC voltage connection interface. FIG. 13D shows one switch SA and capacitor CA located on the top and one switch SB and capacitor CB located at the bottom. FIG. 13E shows the same as FIG. 13D with the connection of capacitor CB to a point along the DC voltage connection interface. Numerous other configurations could be readily envisioned by one of ordinary skill in the art that would provide the same or similar functionality as what is disclosed herein and would not depart from the scope of this disclosure.

Figures 14A, 14B:
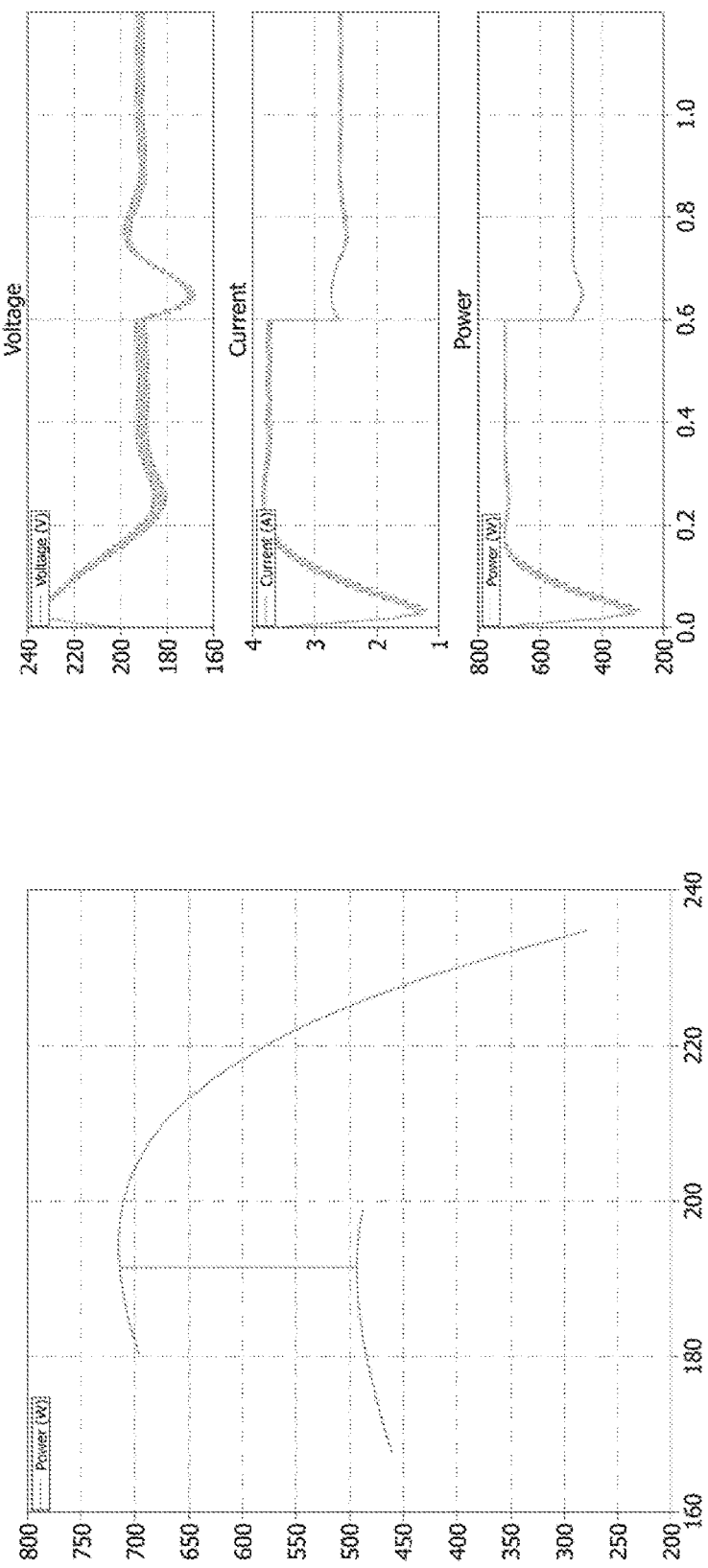
FIGS. 14A thru 14D show the simulation results of the PV inverter circuit;.
Figures 14C, 14D:
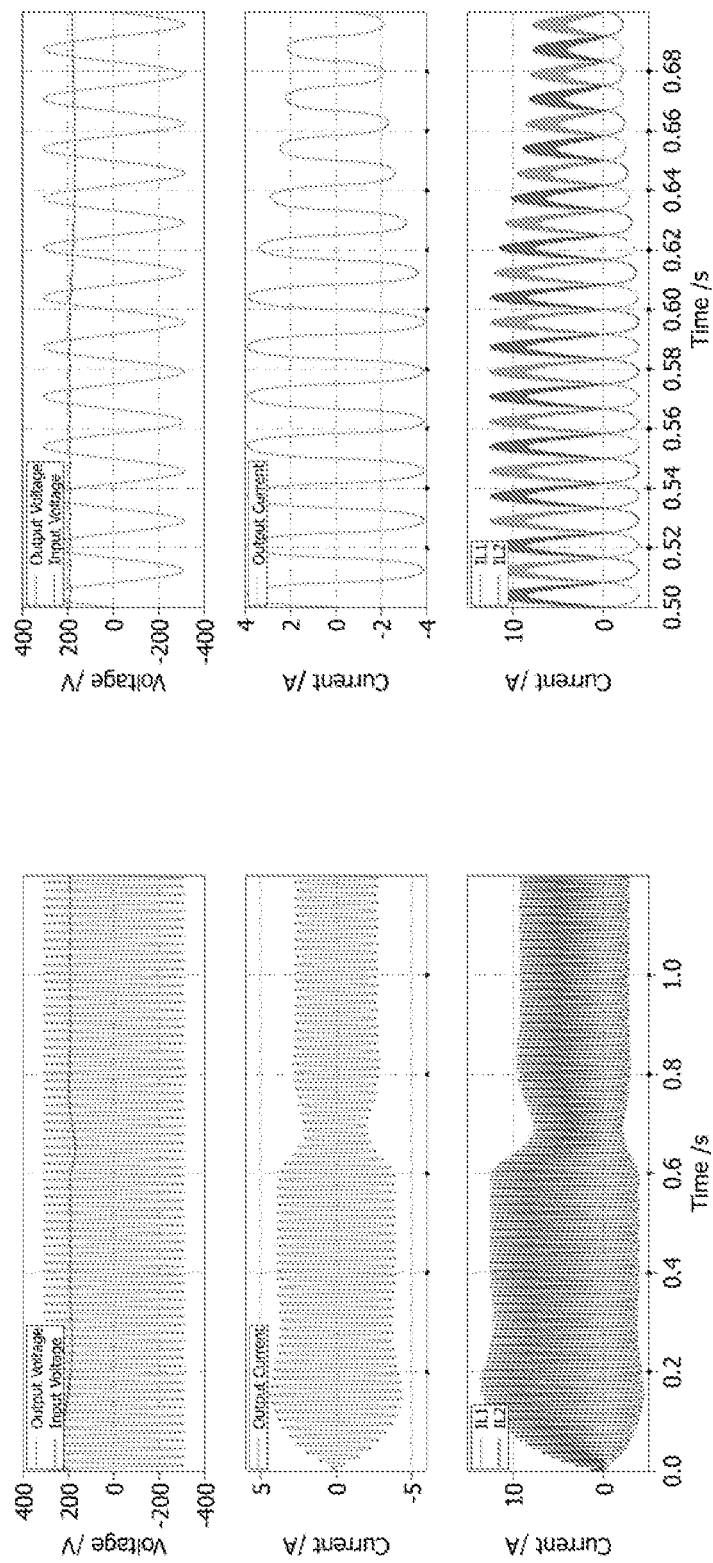

FIGS. 14A thru 14D show the simulation results of a PV inverter circuit comprising the VSI circuit shown in FIG. 1. In particular, FIG. 14A provides a power-voltage diagram, which shows that the converter manages to reach a new Maximum Power Point (MPP) rapidly. FIG. 14B provides the DC input voltage, the current, and power waveforms of the VSI circuit. FIG. 14C shows the time domain waveforms for the output voltage and current, as well as the inductor currents. Note that the output current can reach a steady state after the operating MPP changed. FIG. 14D shows that the time domain waveforms (notably the output current waveform) of FIG. 14C are sinusoidal.

FIGS. 15A and 15B show exemplary isolation circuits for the power converter circuits described herein. These circuits perform the same functions as described above, however the DC voltage ports and the AC voltage ports are separated (isolated) by transformers or coupled inductors 1502 and 1504.

Figure 16:
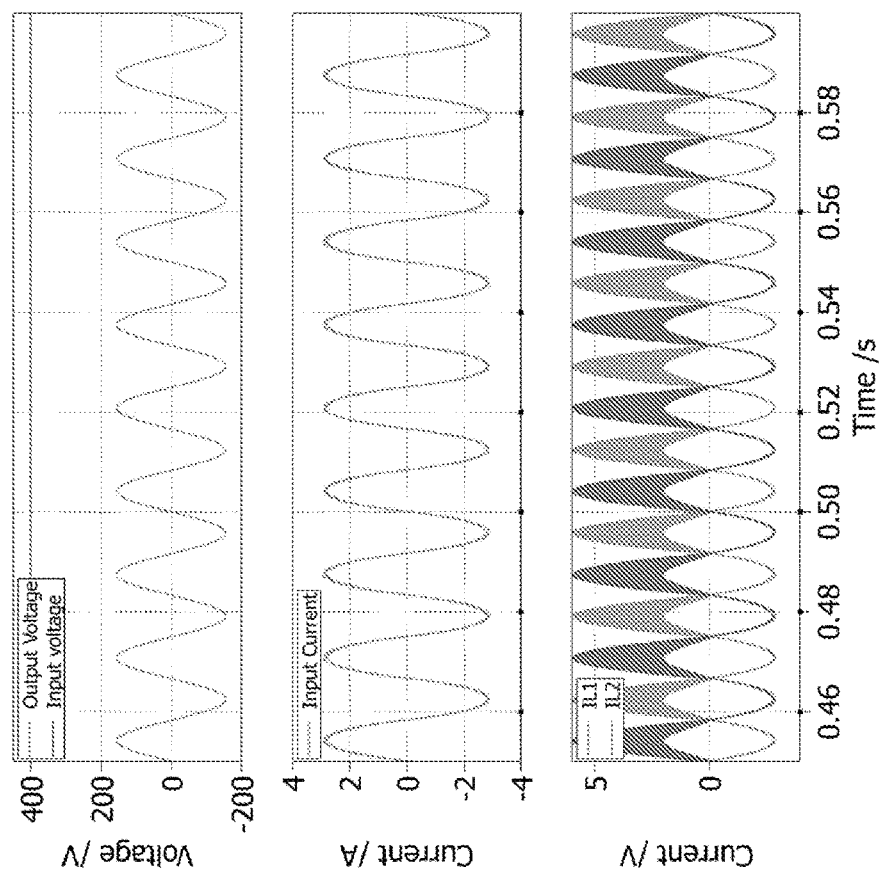
FIG. 16 shows the simulation results for the VSI circuit of FIG. 1 in buck mode.
Figure 17:
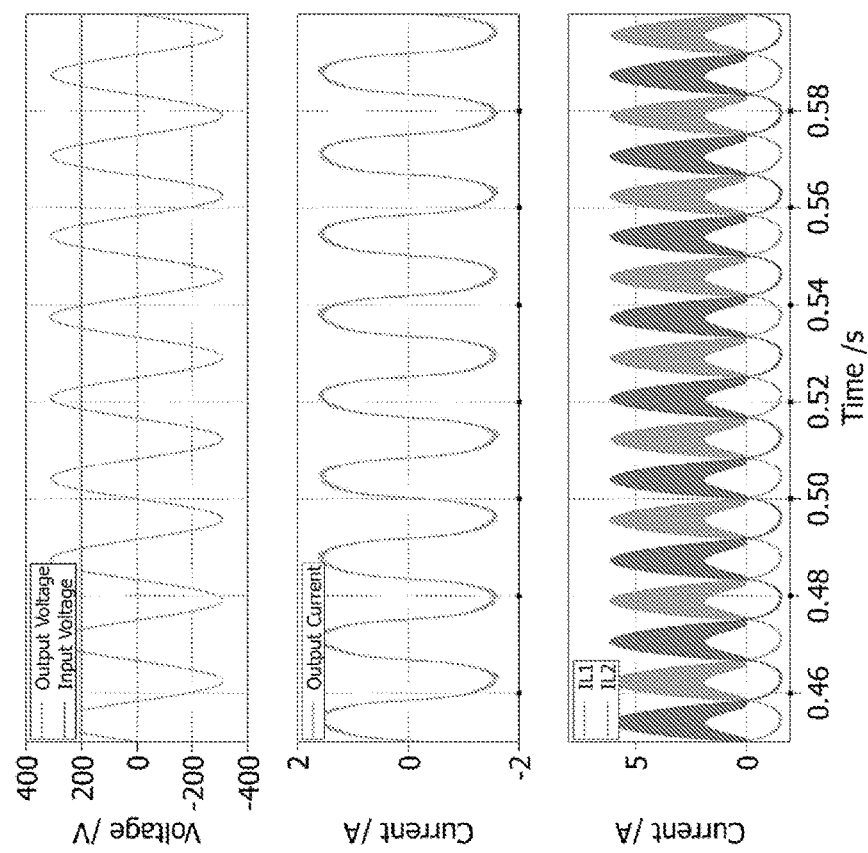
FIG. 17 shows the simulation results for the VSI circuit of FIG. 1 in buck-boost mode.
Figure 18:
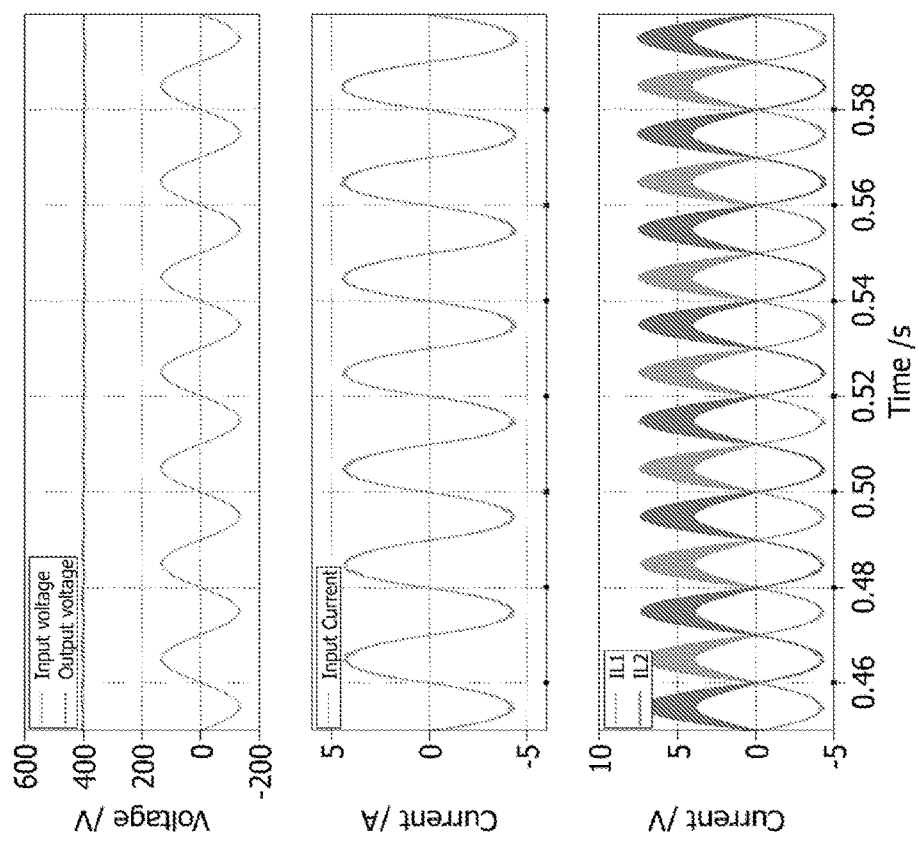
FIG. 18 shows the simulation results for the PFC of FIG. 2 in boost mode.
Figure 19:
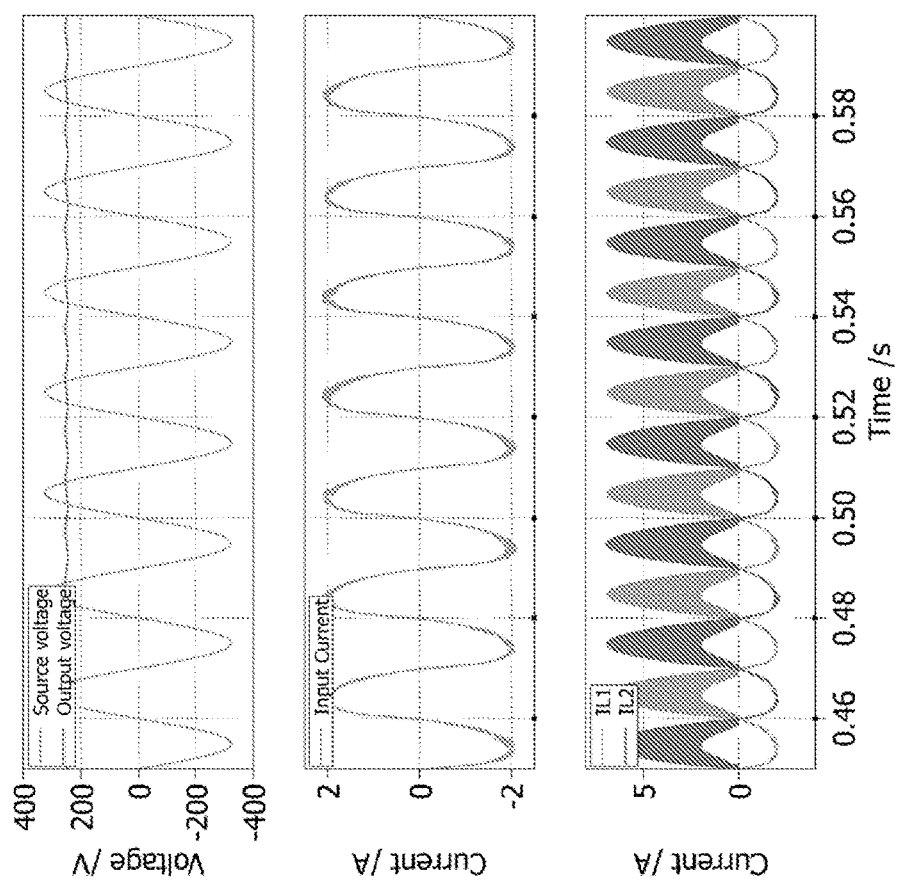
FIG. 19 shows the simulation results for the PFC of FIG. 2 in buck-boost mode.

FIGS. 16 thru 19 show further simulation results of the bi-directional buck-boost converter circuits of FIG. 1 and FIG. 2. In particular, FIG. 16 shows the simulation results for the VSI circuit of FIG. 1 in buck mode. FIG. 17 shows the simulation results for the VSI circuit of FIG. 1 in buck-boost mode. FIG. 18 shows the simulation results for the PFC of FIG. 2 in boost mode. FIG. 19 shows the simulation results for the PFC of FIG. 2 in buck-boost mode.

The VSI and PFC circuits disclosed herein, including their variants, may be implemented as part of any application requiring inverting technology or power factor correction technology, including but not limited to PV inverters, power supplies, electric vehicle charges, and AC grid and DC grid interfaces.

It would be appreciated by one of ordinary skill in the art that the circuits and components shown in FIGS. 1-19 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as defined in the claims.

What is claimed is:

1. An electric power conversion circuit, comprising:
   a direct current (DC) voltage connection interface providing a positive DC port and a negative DC port;
   an alternating current (AC) voltage connection interface providing a positive AC port and a negative AC port;
   a first series connection having a first diode (D1) with a first inductor (L1), connected in parallel with the positive DC port and negative DC port of the DC voltage connection;
   a second series connection having a second diode (D2) with a second inductor (L2), connected in parallel with the positive DC port and negative DC port of the DC voltage connection;
   a first switch (S3) having a first end connected to a point along the first series connection between the first diode (D1) and the first inductor (L1), and having a second end connected to the positive AC port of the AC voltage connection;
   a second switch (S4) having a first end connected to a point along the second series connection between the second diode (D2) and the second inductor (L2); and
   a reconfigurable capacitor-inductor (CL) filter circuit configured to connect one or more switching capacitors (CAB; CA, CB) between the AC ports and the DC ports.

2. The electrical power conversion circuit of claim 1 wherein the reconfigurable CL filter circuit comprising two low frequency bi-directional switching semiconductor switches (SA, SB) connected in series with the one or more capacitors, each of the two low frequency bi-directional switching semiconductor switches connected to a respective AC port.

3. The electrical power conversion circuit of claim 1, wherein the first and second diodes (D1 and D2) are polarized to allows current to flow to the positive DC port of the DC voltage connection.

4. The electrical power conversion circuit of claim 1, wherein the first switch (S3) and second switch (S4) each comprise a high-frequency semiconductor switch with a parasitic anti-parallel diode.

5. The electrical power conversion circuit of claim 1, wherein when an input voltage is positive the low frequency bi-directional switching semiconductor switches (SA and SB) actuate to connect one of the one or more switching capacitors (CAB; CA, CB) to the positive AC port, and wherein when the input voltage is negative the low frequency bi-directional switching semiconductor switches (SA and SB) actuate to connect one of the one or more switching capacitors (CAB; CA, CB) to the negative AC port.

6. The electrical power conversion circuit of claim 5, wherein the two low frequency bi-directional switching semiconductor switches (SA and SB) conduct alternately.

7. The electrical power conversion circuit of claim 1, wherein there are two switching capacitors (CA and CB), each connected in series with a respective low frequency bi-directional switching semiconductor switch (SA and SB).

8. The electrical power conversion circuit of claim 1, wherein an input voltage is received at the DC voltage connection interface and an output voltage is produced at the AC voltage connection interface.

9. The electrical power conversion circuit of claim 8, wherein the first and second diodes (D1 and D2) are parasitic anti-parallel components in respective high-frequency semiconductor switches to form two additional switches (S1 and S2).

10. The electrical power conversion circuit of claim 9, wherein the first switch (S3) prevents electricity from flowing to the positive port of the AC voltage connection, and wherein the second switch (S4) prevents electricity from flowing to the negative port of the AC voltage connection.

11. The electrical power conversion circuit of claim 1, wherein an input voltage is received at the AC voltage connection interface and an output voltage is produced at the DC voltage connection interface.

12. The electrical power conversion circuit of claim 11, wherein the first switch (S3) prevents electricity from flowing from the positive port of the AC voltage connection, and wherein the second switch (S4) prevents electricity from flowing from the negative port of the AC connection.

* * * * *